United States Patent [19]

Vandervoort et al.

[11] Patent Number: 5,052,535
[45] Date of Patent: Oct. 1, 1991

[54] POSITIVE CLUTCH STRUCTURE

[75] Inventors: John R. Vandervoort, Richland; Alan R. Davis, Plainwell, both of Mich.

[73] Assignee: Eaton Corporation, Cleveland, Ohio

[21] Appl. No.: 87,181

[22] Filed: Aug. 17, 1987

[51] Int. Cl.⁵ ............................................. F16D 11/00
[52] U.S. Cl. .................................... 192/67 R; 74/332
[58] Field of Search ................ 192/67 R; 74/332, 333

[56] References Cited

U.S. PATENT DOCUMENTS

| | | | |
|---|---|---|---|
| Re. 29,601 | 4/1978 | Richards | 74/339 |
| 1,927,641 | 9/1933 | Griffith | 74/332 |
| 2,125,526 | 8/1938 | Trimbath | 192/67 R |
| 2,450,896 | 10/1948 | Kimberly, Jr. | 192/67 R |
| 2,646,691 | 7/1953 | Heisler | 192/67 R |
| 2,942,490 | 6/1960 | Riley, Jr. et al. | 192/67 R |
| 3,105,395 | 10/1963 | Perkins | 74/745 |
| 3,265,173 | 8/1966 | Russell | 192/67 R |
| 3,335,616 | 8/1967 | Perkins | 74/331 |
| 3,500,695 | 3/1970 | Keiser | 74/331 |
| 3,739,892 | 6/1973 | Liberty, Jr. | 192/67 R |
| 3,799,002 | 3/1974 | Richards | 74/745 |
| 3,921,469 | 11/1975 | Richards | 74/339 |
| 4,375,172 | 3/1983 | Richards et al. | 74/339 |
| 4,388,838 | 6/1983 | Richards et al. | 74/331 |

FOREIGN PATENT DOCUMENTS 2932910  2/1980  Fed. Rep. of Germany .
2081822  2/1982  United Kingdom .

Primary Examiner—Rodney H. Bonck
Attorney, Agent, or Firm—H. D. Gordon

[57] ABSTRACT

A positive clutch system (100) is provided for selectively rotationally coupling and decoupling a first (22) and second (38) rotatable member. The total system rotational backlash is distributed to minimize the backlash component (222) dependent upon directions of relative rotation and to maximize the backlash component (220) independent of relative rotation.

10 Claims, 5 Drawing Sheets

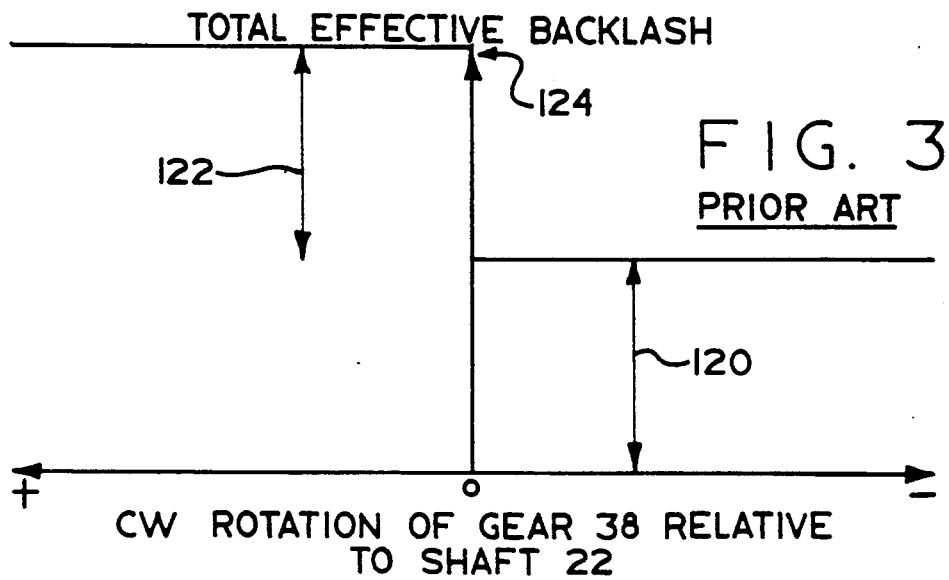
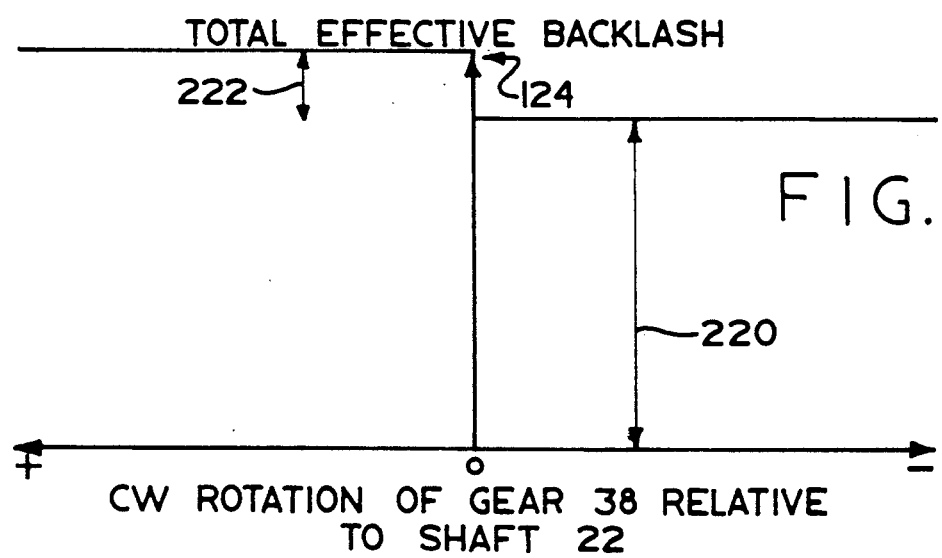
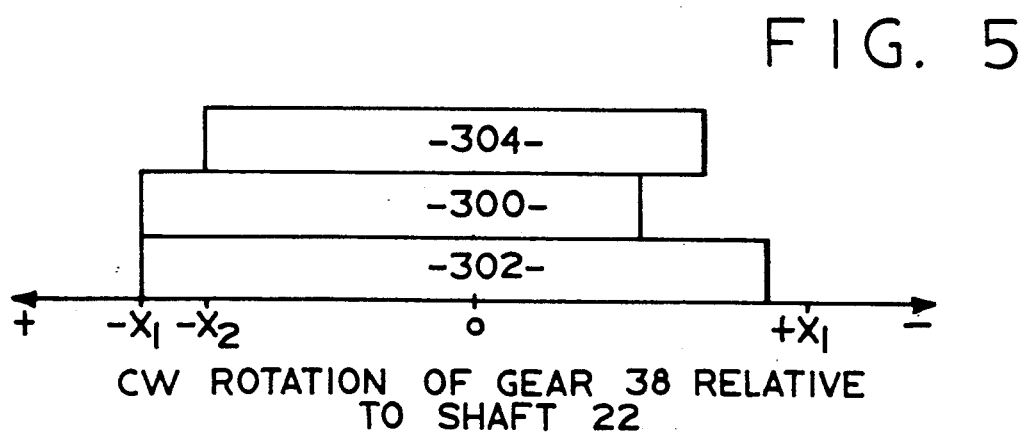

POSITIVE CLUTCH STRUCTURE

BACKGROUND OF THE INVENTION

1. Field of the Invention

This invention relates to an improved structure for positive clutches of the type comprising a first clutch member fixed for rotation, with a degree of rotational freedom, to a first rotatable device and selectively engagable with a second clutch member rotatable with a second rotatable device.

More particularly, the present invention relates to the distribution of backlash, or rotational freedom, between the clutch system members of a positive clutch system.

2. Description of the Prior Art

Positive clutch systems for selectively rotationally coupling and decoupling a first rotatable device, such a gear, to a second rotatable device, such as a shaft, are, of course, well known in the prior art. Change gear transmissions utilizing such positive clutches, without synchronizing mechanisms to minimize the cost, size and/or complexity thereof, are well known in the prior art as may be seen by reference to U.S. Pat. Nos. 2,951,395; 3,105,395; 3,335,616; 3,500,695; 3,799,002 and 4,388,838, the disclosures of which are hereby incorporated by reference.

The clutch members of nonsynchronized positive clutch systems are, preferably, provided with clutch teeth having a leading edge structure which, during a clutch engagement, will tend to cause the clutch members to ratchet rather than engage if the relative rotational speeds thereof exceed a predetermined value. An example of such a clutch tooth structure may be seen by reference to U.S. Pat. No. 3,265,173, the disclosure of which is hereby incorporated by reference. As is known, for a given engagement force, the maximum allowable relative rotational speed at which the positive clutches will properly engage (i.e. sufficient clutch tooth penetration will occur) is a directly proportional function of the total effective backlash in the clutch system. The maximum allowable asynchronous conditions at which clutch engagement is allowed is selected in view of the most harsh clutch engagement which is acceptable.

While change gear transmissions utilizing the nonsynchronized positive clutch structures of the prior art, especially for heavy duty vehicles, are very commercially successful, such transmissions and clutch structures are not totally satisfactory as, for a given total backlash, i.e. a given maximum allowably harsh clutch engagement, the range of asynchronous conditions at which the clutch members will engage is narrower than desirable making shifting more difficult.

SUMMARY OF THE INVENTION

In accordance with the present invention, the drawbacks of the prior art have been minimized by the Provision of a positive clutch structure which, for a given allowable maximum rotational speed difference between jaw clutch members at which clutch engagement will occur, will maximize the range of clutch member rotational speed differences at which the clutch will engage.

The above is accomplished by determining the value of total clutch system effective backlash which will allow clutch engagement at the predetermined maximum acceptable asynchronous engagement conditions, i.e. the value of total effective backlash corresponding to the harshest acceptable engagement conditions. The component of total clutch system backlash which is a step function of the direction of relative rotation between the rotatable devices to be rotatably coupled by the positive clutch is identified and set to a minimum value of view of manufacturing and functional considerations. The remainder of total system backlash is provided at the component which is independent of direction of relative rotation.

The total effective backlash of the clutch system when a first relative rotation condition exists is equal to total system backlash and, when the other relative rotation condition exists, is equal to the backlash component independent of relative rotation. Total system backlash is defined by the maximum acceptable asynchronous engagement condition. Thus, given a maximum acceptable asynchronous engagement condition, by minimizing the value of the backlash component dependent on relative rotation, the overall range of rotational speed difference at which the clutch will engage is maximized.

Accordingly, it is an object of the present invention to distribute the total backlash of a clutch system in a new and novel manner to provide an improved positive clutch system.

This and other objects and advantages of the subject invention will become apparent from a reading of the description of the preferred embodiment taken with the attached drawings.

BRIEF DESCRIPTION OF THE DRAWINGS

FIG. 3 is a symbolic representation of total effective system backlash in a typical prior art positive clutch system.

FIG. 4 is a symbolic representation of total effective system backlash in the positive clutch system of the present invention.

FIG. 5 is a symbolic representation of the ranges of relative clutch member rotation in which the clutches of the prior art and of the present invention can be engaged.

DESCRIPTION OF THE PREFERRED EMBODIMENT

In this disclosure, certain terminology will be used for convenience in reference only and will not be limiting. For example, the terms "inward" and "outward" will refer to directions toward and away from, respectively, the geometric center of the apparatus being described. The terms "rightward" and "leftward" will refer to directions in the Figures. The terms "clockwise" and "counterclockwise" will refer to directions of rotation of the members being described as viewed in FIG. 2. The foregoing applies to normal derivatives of the terms specifically mentioned and terms of similar import.

Positive clutches rotationally couple and decouple relatively rotatable members by means of engagable clutch teeth, or the like, and are distinguished from slip clutches which couple and decouple by frictional, fluid, magnetic field or similar means and typically allow a continuous relative rotation or slip between the coupled members Positive clutches are also referred to as jaw clutches and as dog clutches.

Figure 1:
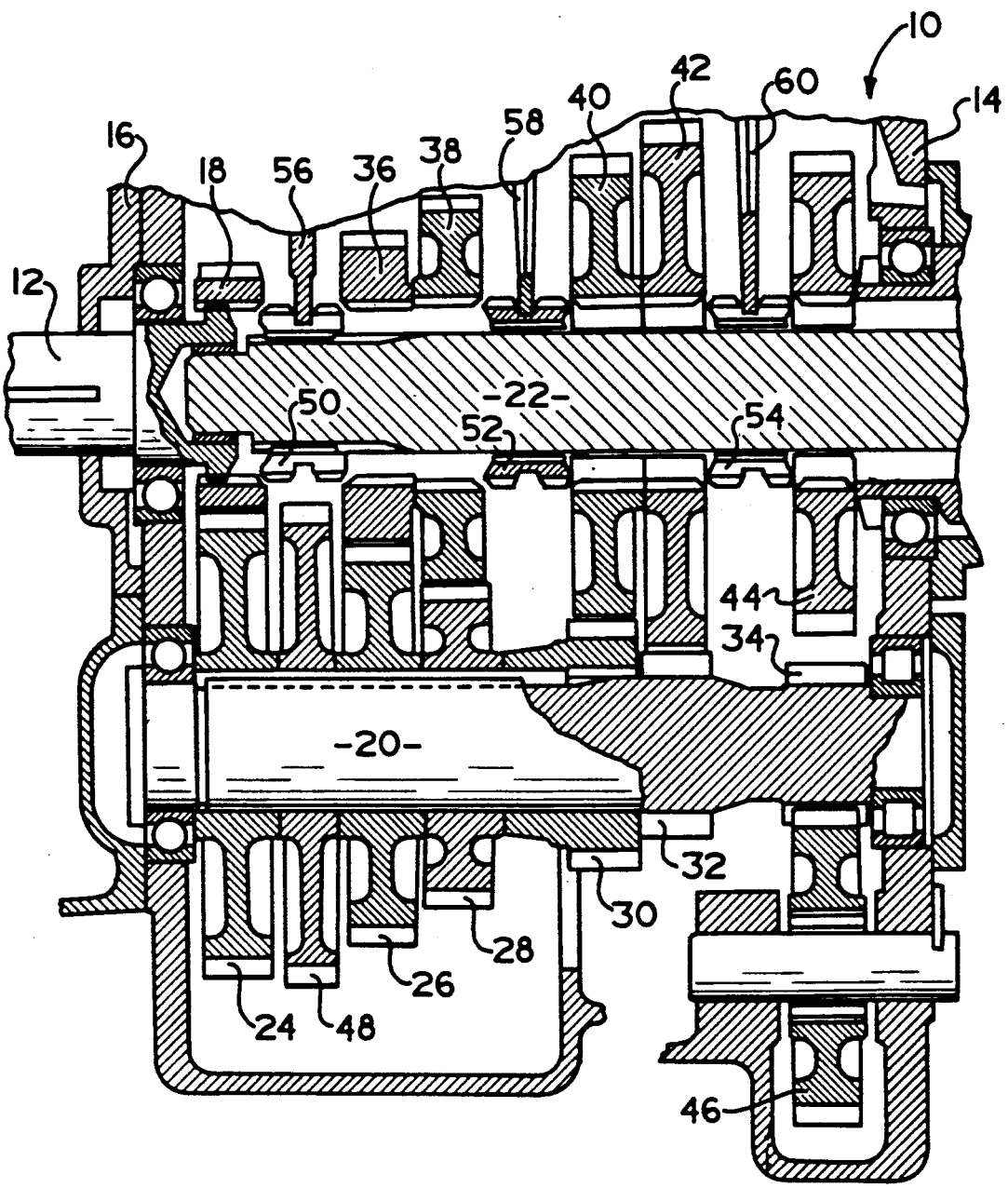
FIG. 1 is a plan view, in section, of a prior art change gear transmission in which the positive clutch structure of the present invention may be advantageously utilized.

A typical change gear nonsynchronized transmission of the type with which the positive clutch structures of the present invention may be advantageously utilized is illustrated in FIG. 1. While the positive clutch structure of the present invention is particularly well suited for use in change gear transmissions of the type illustrated in FIG. 1, the positive clutch structure of the present invention may also be utilized in the other environments in which positive clutches are normally utilized.

The transmission 10 illustrated in FIG. 1 is a simple, five forward speed, one reverse speed transmission of the twin countershaft type. It is understood that the positive clutch structure of the present invention is equally well suited for use in transmissions of the single countershaft type. The transmission 10 comprises an input shaft 12 designed to be driven by the prime mover (not illustrated) of a vehicle through a master friction clutch (not illustrated). The transmission 10 includes a housing 14 and a master clutch housing portion 16. A drive or input gear 18 is fixed for rotation on input shaft 12. A pair of countershafts 20 (only one of which is illustrated) and a mainshaft 22 are rotationally supported in transmission housing 14.

Countershafts 20 each carry countershaft gears 24, 26, 28, 30, 32, and 34 fixed for rotation thereon. Mainshaft gears 36, 38, 40 and 42 surround the mainshaft and are constantly engaged with and supported by the countershaft gear pairs 26—26, 28—28, 30—30, and 32—32, respectively. Mainshaft gear 44 surrounds mainshaft 22 and is constantly engaged with and supported by a pair of reverse idler gears 46 which in turn are constantly meshed with countershaft gear pair 34—34. Input gear 18 is constantly meshed with gear pair 24—24. An additional gear 48 may be provided on countershaft 20 for purposes of driving power takeoff devices and the like as is well known in the art.

Axially slidable clutch collars 50, 52 and 54, are splined to the mainshaft 22 for rotation therewith and are provided with external clutch teeth thereon for meshing engagement with internal clutch teeth provided on the mainshaft gears and input gear 18 for selectively Positively clutching same to the mainshaft 22. The slidable clutch collars 50, 52 and 54 are provided with means for engaging shift forks 56, 58 and 60, respectively, which extend from the shift bar housing assembly (not shown) for selectively displacing the shift collars, one at a time, as is well known in the prior art.

The operation and structural features of the "floating" mainshaft, multiple countershaft type of transmission described above is well known in the prior art and a more detailed description thereof may be seen by reference to above-mentioned U.S. Pat. Nos. 3,105,395; 3,335,616; 4,388,838. Preferably, the mainshaft gears are axially retained on, but free for predetermined radial movement relative to, mainshaft 22, by means of gear retainers (not shown) of the type illustrated in U.S. Pat. No. 4,034,620, the disclosure of which is hereby incorporated by reference. The output shaft of transmission 10 may be an integral extension of mainshaft 22 or may comprise an assembly splined for rotation with mainshaft 22.

Figure 2:
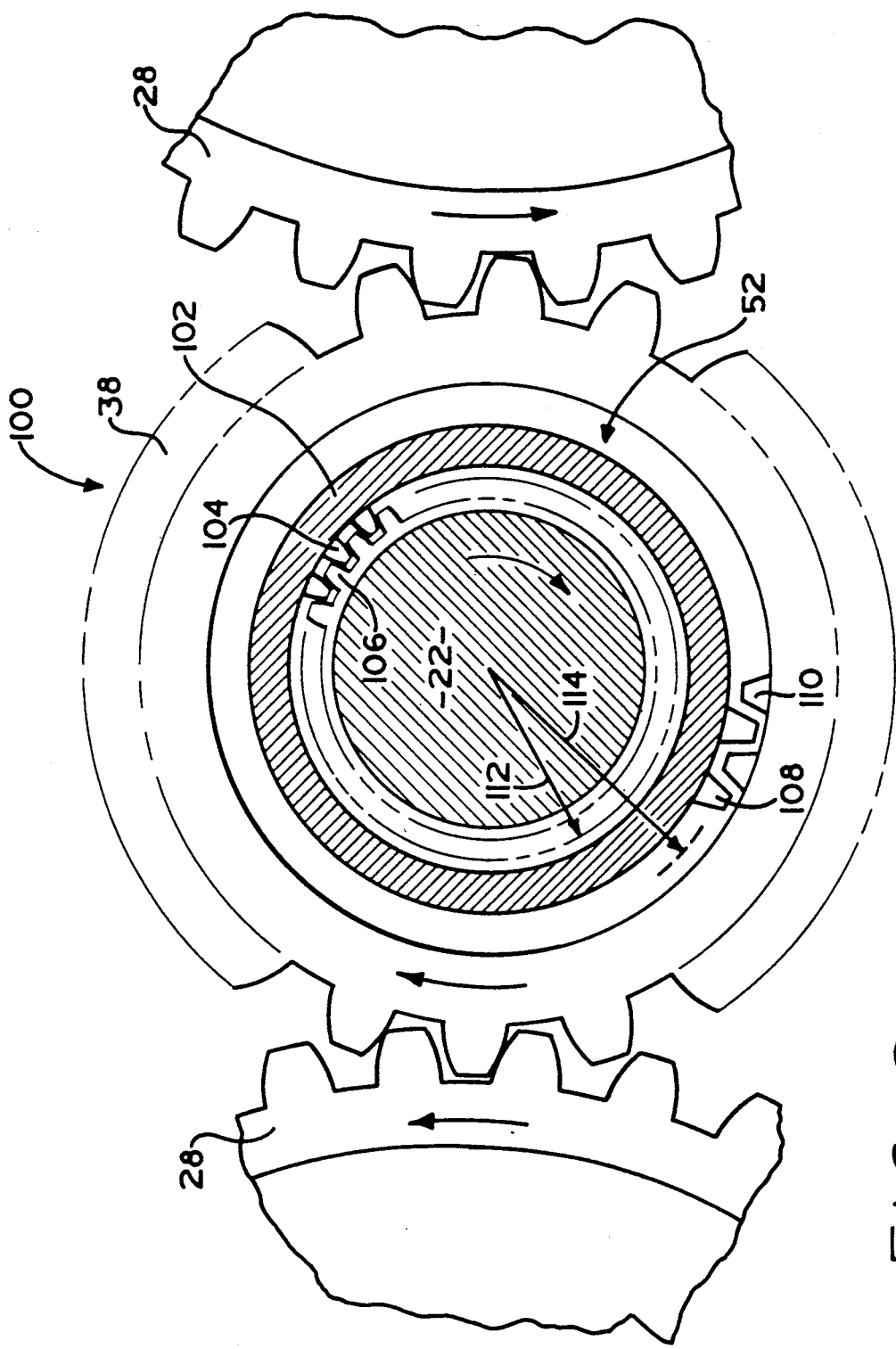
FIG. 2 is an enlarged, sectional view of a positive clutch system of the present invention.

Referring to FIG. 2, the details of a positive clutch system for selectively rotationally coupling a first rotatable member, such as mainshaft, to a second rotatable member, such as 22, is illustrated. Briefly, the positive clutch system 100 includes the leftward or forward end 102 of double acting clutch collar 52. The clutch collar 52 is Provided with internal spline teeth 104 which cooperate with external spline teeth 106 provided on mainshaft 22 to mount the clutch collar 52 to the mainshaft 22 for rotation therewith and axially sliding movement relative thereto. The clutch member 102 is also provided with external clutch teeth 108 for selective engagement with internal clutch teeth 110 formed integrally with gear 38. Accordingly, portion 102 of clutch collar 52 which carries the external clutch teeth 108 and is rotationally fixed to mainshaft 22 may be considered a first clutch member and the hub portion of gear 38 which carries the internal clutch teeth 110 may be considered the second clutch member of a positive clutch for selectively rotationally coupling and decoupling mainshaft gear 38 from mainshaft 22.

As is described in greater detail in above-mentioned U.S. Pat. No. 3,265,173, the leading edges of the clutch teeth 108 and 110 are inclined relative to the rotational axis of mainshaft 22, preferably about 35° relative to the rotational axis of mainshaft 22, whereby, at initiation of a clutch engagement operation if the relative rotation between clutch members 102 and 38 exceeds a predetermined limit, the leading edges of the clutch teeth will cause the clutch members to ratchet rather than go into engagement to prevent unacceptably harsh shifting and/or damage to the clutch members. The maximum value of relative rotation between the engaging clutch members, i.e. the maximum amount of asynchronous rotation under which the clutch members will engage, assuming a constant axial engagement force, is determined by the total effective backlash, or rotational freeplay, of the positive clutch system.

As may be seen, in positive clutch system 100, total system backlash is the sum of the backlash Provided by the spline connection between the clutch collar 52 and mainshaft 22 and the backlash between the clutch teeth 108 and 110 of the clutch collar and gear 38, respectively, to be engaged. In a typical prior art transmission of the type wherein the pitch diameter 112 of the spline connection between the mainshaft 22 and the clutch collar 52 equals about 2.10 inches and the pitch diameter 114 of the interengagable clutch teeth 108 and 110 equals about 3.00 inches, the total backlash in the clutch system might be selected to be 0.024 inches (1.11° of rotation) of which 0.012 inches (0.65° of rotation) would be provided at the splined tooth connection between the mainshaft and sliding clutch collar and 0.012 inches (0.46° of rotation) would be provided at the clutch teeth 108 and 110.

As may be seen by reference to FIGS. 6A and 6B and FIGS. 7A, 7B and 7C, all of which are simplified schematic illustrations of clutch system 100, the effect of backlash 120 between the clutch teeth 108 and 110 is independent of the directions of relative rotation between shaft 22 and gear 38 while the effect of backlash 122 between the spline teeth 104 and 106 is a step function of the direction of relation rotation between shaft 22 and gear 38.

Figure 6A:
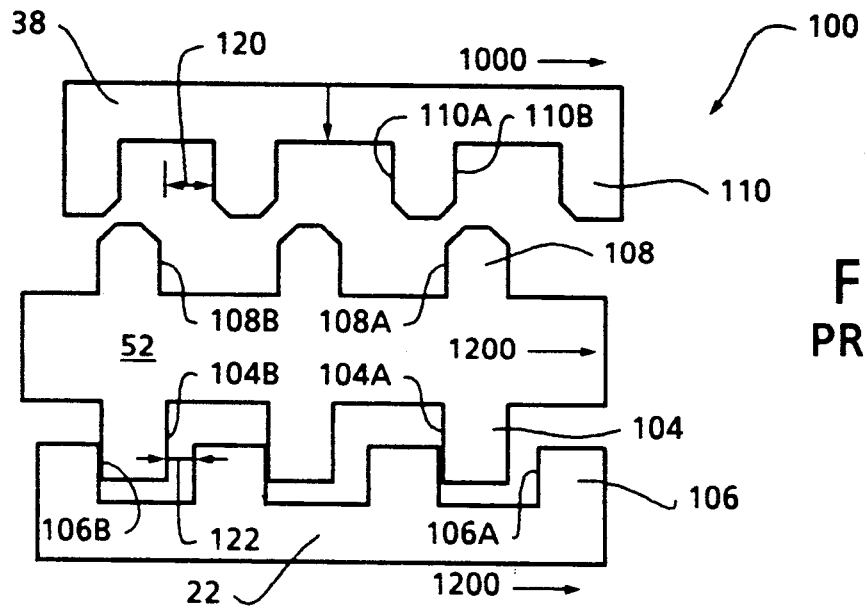
FIGS. 6A, 6B, 7A, 7B and 7C are schematic illustrations of positive clutch systems.
Figure 6B:
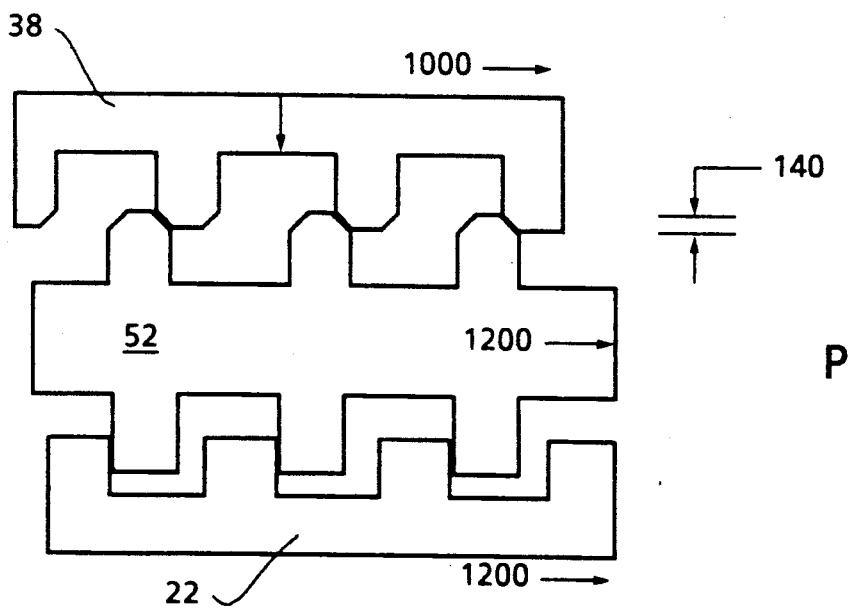

In FIGS. 6A and 6B, gear 38 is rotating (1000 RPM) in the same direction, but slower than, shaft 22 (1200 RPM). Clutch 52 is driven at the same speed (1200 RPM) as shaft 22 and the leftward faces 104A of spline teeth 104 are in driven contact with the rightward faces 106B of spline teeth 106. As the gear 38 is urged toward the clutch 52, the clutch teeth 108 and 110 will penetrate freely by a distance 140 until the gear 38 has moved relatively leftwardly relative to the clutch 52 by a distance equal to backlash 120 bringing the leftward faces 110A of clutch teeth 110 into driven contact with the rightward faces 108B. At this point, see FIG. 6B, no additional free penetration will occur.

Figure 7A:
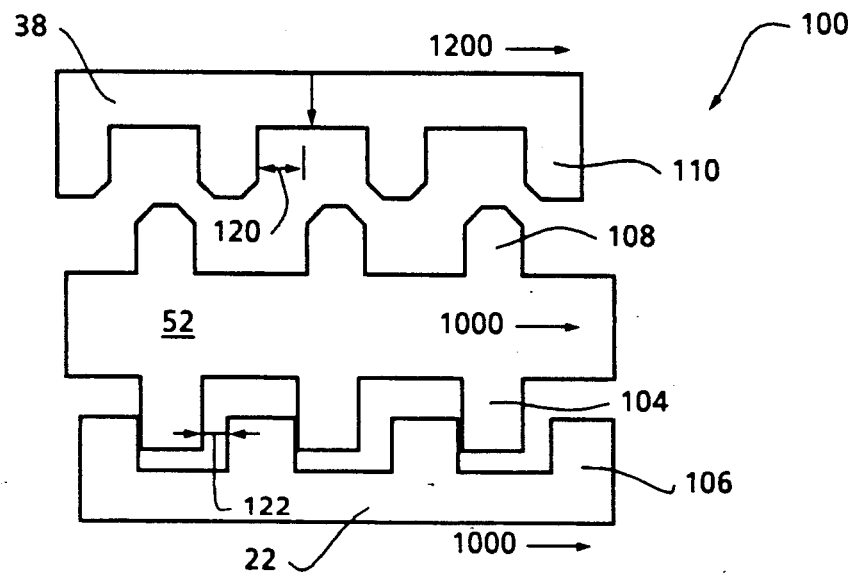
Figure 7B:
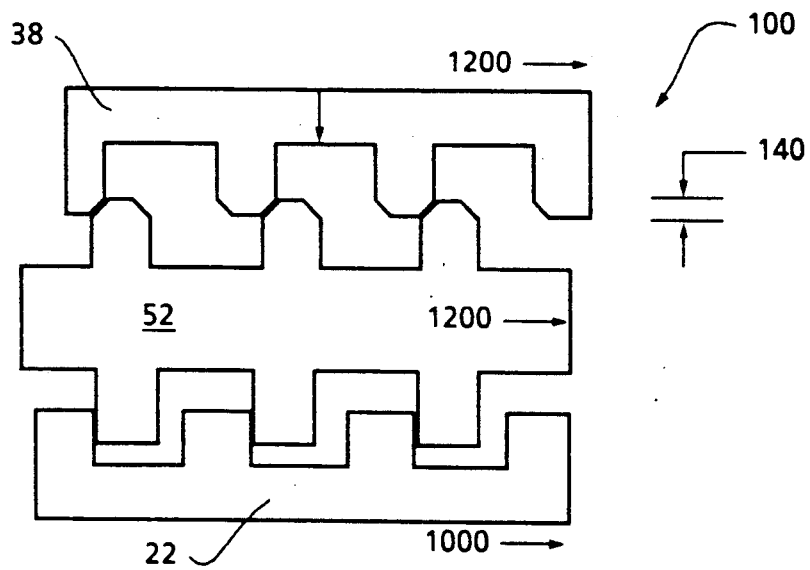
Figure 7C:
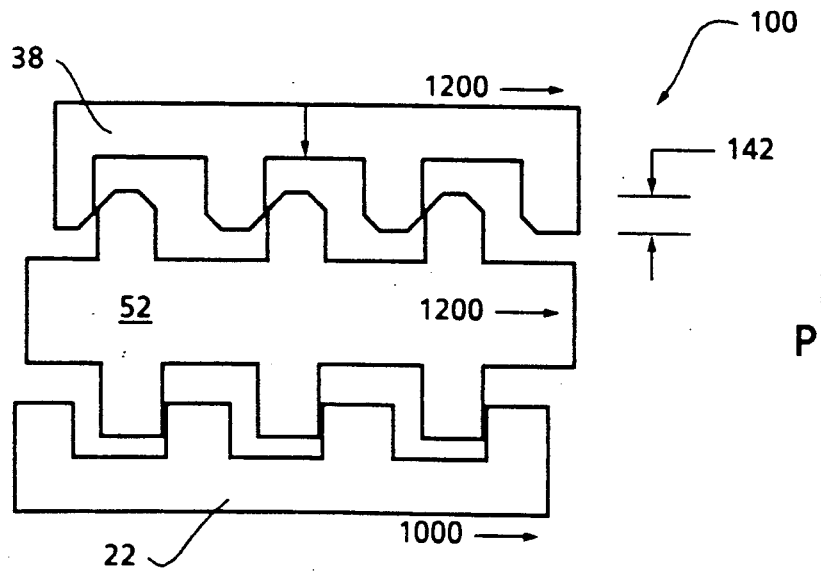

In FIGS. 7A, 7B and 7C, gear 38 is rotating (1200 RPM) in same direction, but faster than, shaft 22 (1000 RPM). Clutch 52, prior to engagement with gear 38 driven at the same speed (1000 RPM) as shaft 22 and the leftward faces 104A of spline teeth 104 are in driven contact with the rightward faces 106B of spline teeth 106. As the gear 38 is urged toward the clutch 52, the clutch teeth 108 and 110 will penetrate by distance 140 until the gear 38 has moved relatively rightwardly relative to the clutch 52 by a distance equal to the backlash 120 bringing the rightward faces 110B of teeth 110 into driving contact with the leftward faces 108A of teeth 108, see FIG. 7B.

At this point, the clutch teeth 108 and 110 will continue to penetrate to a greater distance 142 (see FIG. 7C) relatively freely as the clutch 52 is driven rightwardly by the gear 38 by a distance equal to backlash 122 bringing the rightward faces 104B of spline teeth 104 into driving contact with the leftward faces 106A of spline teeth 106.

At this point, no further free penetration of the clutch teeth will occur.

As may be appreciated from the above, in clutch system 100, the effect of the backlash 120 between the clutch teeth on clutch engagement is independent of the direction of relative rotation between the gear 38 and shaft 22 while the effect of the backlash 122 at the spline connection is a step function of such relative rotation.

The effect of equally distributing the total system backlash between the splined tooth connection and the clutch teeth may be seen by reference to FIG. 3, assuming that gear 38 and mainshaft 22 are both rotating in the clockwise direction. So long as gear 38, is rotating faster than mainshaft 22, the total effective hacklash of the positive clutch system 100 will equal the sum of the backlash 120 between the interengagable clutch teeth 108 and 110 and the backlash 122 between the splines 104 and 106. However, in those situations wherein the clockwise rotation of gear 38 is less than the clockwise rotation of mainshaft 22, the clutch collar 52 will tend to rotate with shaft 22 to cause the clockwise side of the spline teeth 106 to be firmly engaged with the counterclockwise sides of splines 104 to effectively eliminate the rotational freeplay or backlash between the clutch collar 52 and mainshaft 22. Accordingly, as may be seen by reference to FIG. 3, total effective system backlash before the gear 38 passes synchronous rotation with mainshaft 22, is equal to the backlash 120 provided at the clutch teeth only.

The contribution to effective system backlash provided by the backlash 120 between the clutch teeth 108 and 110 is independent of the direction of relative rotation between the gear 38 and the shaft 22. The contribution to effective system backlash provided by he back- lash 122 at the splined connection is a step function of the relative rotational speeds of gear 38 and shaft 22.

Referring to FIG. 4, it may be seen, that for an identical maximum total effective system backlash 24, if the distribution between the independent component 220 (i.e. backlash at clutch teeth) and the dependent component 222 (i.e. backlash at spline connection) is altered such that the value of the relative rotation dependent component 222 is minimized to a value necessary for proper manufacturing and sliding function considerations, total effective system backlash available when mainshaft 22 overspeeds the gear 38 is considerably increased. The effect of this may be seen by reference to FIG. 5. In FIG. 5, bars 300 and 302, respectively, represent the relative rotational speeds of the gear 38 and mainshaft 22 under which the positive clutch 100 may be engaged under the prior art and the present invention, respectively, distributions of total system backlash. As may be seen, by increase of the effective system backlash when gear 38 is underspeeding shaft 22, the range of relative rotational speeds between the clutch members at which a clutch engagement can be achieved without exceeding the predetermined maximum clutch engagement harshness is considerably increased. As an alternative, referring to bar 304, and utilizing the backlash distribution method of the present invention, the range of relative rotational speeds at which clutch engagements can be achieved can be held constant with a considerable increase in the quality, i.e. a lowering of the harshness, at which clutch engagement will be achieved. In this example $X_2$ defines the harshest allowable clutch engagement.

Accordingly, it may be seen that, by providing a positive clutch system with a backlash distribution according to the present invention, the ease of achieving a clutch engagement may be increased, i.e. a broader range of relative rotation between the clutch members for allowable engagement thereof, without increasing the harshness of the shift, or the harshness of the shift may be decreased without increasing the difficulty of shifting, i.e. without decreasing the range of relative clutch member rotational speeds at which clutch engagement may be obtained, and/or a combination thereof, is provided.

Although the present invention has been described in its preferred form with a certain degree of particularity, it is understood that the present disclosure of the preferred form has been made only by way of example and that numerous changes in the details of construction and combination and arrangement of the parts may be resorted to without departing from the spirit and the scope of the invention as here and after claimed.

We claim:

1. A positive clutch system for selectively rotationally coupling and decoupling first and second independently rotatable members, said clutch system comprising a first clutch member rotatable with said first rotatable member and a second clutch member rotatable with said second rotatable member, said first and second clutch members carrying first and second engagable clutch teeth, said first clutch member having a limited degree of rotational free play relative to said first rotatable member, said clutch system defining a total rotational backlash comprising a first component of an effective magnitude dependent on the direction of relative rotation between the first and second rotatable members and a second component of an effective magnitude independent of the direction of relative rotation between the first and second rotatable members, said total rotational backlash having a predetermined maximum effective magnitude equal to the total of the magnitudes of said first and second components; said system characterized by:

the magnitude of said first component being substantially equal to a predetermined minimum value.

2. The clutch system of claim 1 wherein the magnitude of said second component is greater than the magnitude of said first component.

3. The clutch system of claim 2 wherein the magnitude of said second component is at least twice as great as the magnitude of said first component.

4. The clutch system of claim 2 wherein the magnitude of the second component is a constant and the effective magnitude of the first component is step function having a value of either zero or a known value, depending upon the direction of relative rotation between said first and second rotatable members.

5. The clutch system of claim 4 wherein said clutch system is a nonsynchronized clutch system and said clutch members will, when urged into engagement with a substantially constant force, engage at a maximum asynchronous rotation therebetween having a value directly proportional the magnitude of the total rotational backlash.

6. The system of claim 5 wherein said first member is a shaft, said second member is a gear surrounding said shaft and said first clutch member is axially movable relative to said shaft.

7. The clutch system of claim 6 wherein said first clutch member is rotationally mounted to said shaft by means of axially extending splines.

8. The clutch system of claim 7 wherein said second clutch member is integral with said gear.

9. A method for constructing positive clutch systems for selectively rotationally coupling and decoupling first and second independently rotatable members said clutch system comprising a first clutch member rotatable with said first rotatable member and a second clutch member rotatable with said second rotatable member, said first and second clutch members carrying first and second engagable clutch teeth, said first member having a limited degree of rotational free play relative to said first rotatable member, said clutch system defining a total rotational backlash comprising a first component of an effective magnitude dependent on the direction of relative rotation between the first and second rotatable members and a second component of an effective magnitude independent of the direction of relative rotation between the first and second rotatable members, said total system backlash having a maximum magnitude equal to the total of the maximum magnitudes of said first and second components; said method characterized by:

providing a total rotational backlash corresponding to a maximum allowable asynchronous clutch engagement when the clutch members are urged into engagement with a given force; and providing a first component having a magnitude equal to a predetermined minimum allowable value thereof.

10. The method of claim 9 wherein said first member is a shaft, said second member is a gear surrounding said shaft and said first clutch member is axially movable relative to said shaft and mounted to said shaft by means of axially extending splines, said minimum allowable value determined by consideration of backlash required to allow sliding and manufacturing tolerances.

* * * * *